US012587001B2

(12) United States Patent
Tome et al.

(10) Patent No.: US 12,587,001 B2
(45) Date of Patent: Mar. 24, 2026

(54) WIRING MODULE

(71) Applicants:AutoNetworks Technologies, Ltd., Mie
(JP); Sumitomo Wiring Systems, Ltd.,
Mie (JP); **SUMITOMO ELECTRIC
INDUSTRIES, LTD.**, Osaka (JP)

(72) Inventors: Yuta Tome, Osaka (JP); **Housei
Mizuno**, Osaka (JP)

(73) Assignees: **AUTONETWORKS
TECHNOLOGIES, LTD.**, Mie (JP);
**SUMITOMO WIRING SYSTEMS,
LTD., Mie (JP); SUMITOMO
ELECTRIC INDUSTRIES, LTD.**,
Osaka (JP)

( * ) Notice: Subject to any disclaimer, the term of this
patent is extended or adjusted under 35
U.S.C. 154(b) by 183 days.

(21) Appl. No.: 18/564,123

(22) PCT Filed: May 30, 2022

(86) PCT No.: PCT/JP2022/021874
§ 371 (c)(1),
(2) Date: Nov. 27, 2023

(87) PCT Pub. No.: WO2022/264789
PCT Pub. Date: Dec. 22, 2022

(65) Prior Publication Data
US 2024/0258783 A1     Aug. 1, 2024

(30) Foreign Application Priority Data
Jun. 18, 2021    (JP) ................................. 2021-101604

(51) Int. Cl.
*H02G 3/38*        (2006.01)
*H02G 3/04*        (2006.01)

(52) U.S. Cl.
CPC ........... *H02G 3/386* (2013.01); *H02G 3/0418*
(2013.01)

(58) Field of Classification Search
None
See application file for complete search history.

(56)                 References Cited
U.S. PATENT DOCUMENTS 6,272,746 B1 * 8/2001 Mori ................... B60R 16/0207
                                                    269/21
7,201,867 B2 * 4/2007 Kisu ...................... H02G 3/305
                                                    264/510
(Continued)

FOREIGN PATENT DOCUMENTS

JP        2001-136631 A      5/2001
JP        2020-83075 A       6/2020
(Continued)

OTHER PUBLICATIONS

Japanese Office Action in corresponding Japanese Patent Application No. 2021-101604, dated Mar. 26, 2024, and translation thereof.
(Continued)

*Primary Examiner* — Krystal Robinson
(74) *Attorney, Agent, or Firm* — Greenblum & Bernstein,
P.L.C.

(57)                 ABSTRACT
A wiring module includes a base member provided with a groove, a wiring member housed in the groove, and a cover member covering an opening part of the groove to suppress the wiring member coming out of the groove. The cover member includes a cover body covering the opening part of the groove, a first extension part extending from the cover body to one lateral side of the groove, and a second extension part extending from the cover body to another lateral side of the groove. The wiring member is located close to one lateral side inside the groove. A protruding part
(Continued)

entering inside the groove is provided to the cover body on a side of another lateral side of the groove.

7 Claims, 2 Drawing Sheets

(56)                    References Cited

U.S. PATENT DOCUMENTS

| | | | |
|---|---|---|---|
| 2009/0014209 A1* | 1/2009 | Forbis | H02G 3/0418 |
| | | | 174/480 |
| 2021/0098976 A1 | 4/2021 | Yamaguchi et al. | |
| 2022/0017026 A1 | 1/2022 | Yamaguchi et al. | |

FOREIGN PATENT DOCUMENTS

| | | |
|---|---|---|
| WO | WO2018/062014 A1 | 4/2018 |
| WO | WO2019/187334 A1 | 10/2019 |

OTHER PUBLICATIONS

International Search Report issued in International Application No. PCT/JP2022/021874, dated Jul. 19, 2022, along with an English translation thereof.
International Preliminary Report on Patentability issued in International Application No. PCT/JP2022/021874, dated Dec. 14, 2023, along with an English translation thereof.

* cited by examiner

F I G. 1
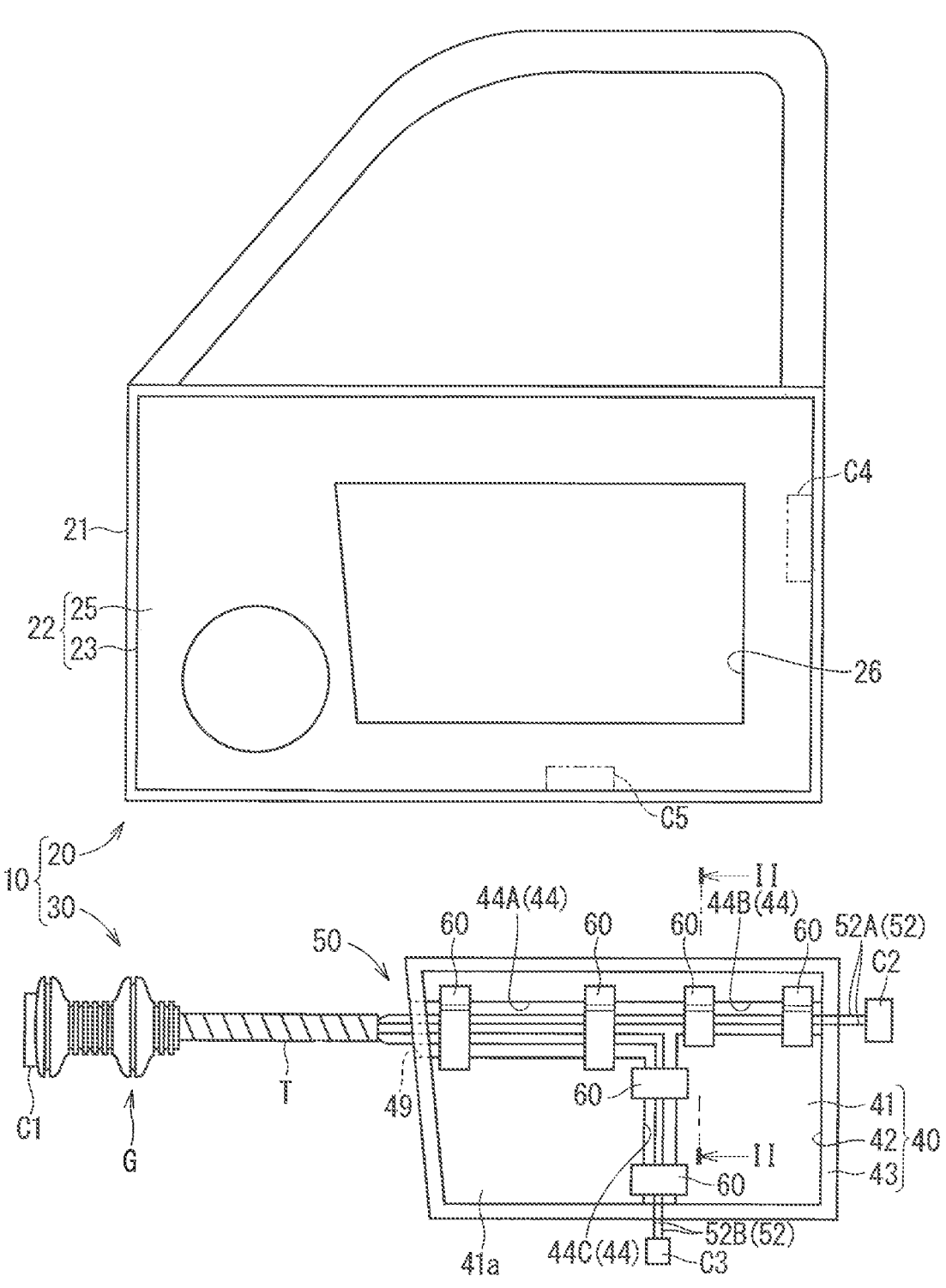

F I G .  2
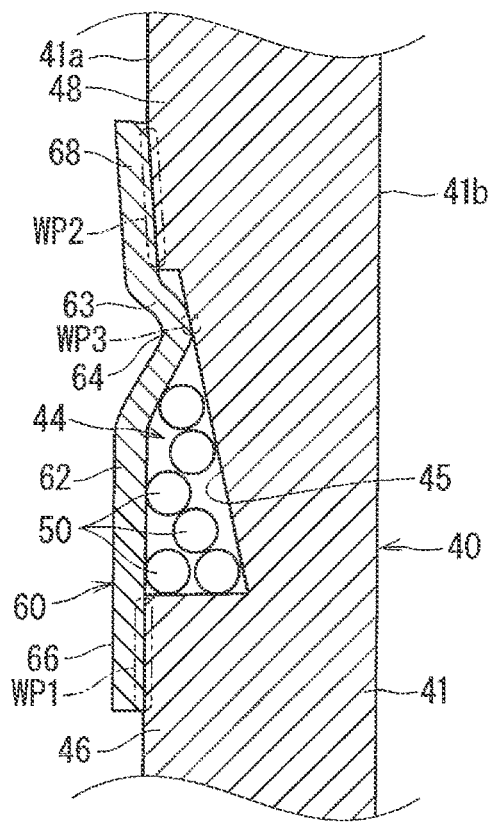
F I G .  3
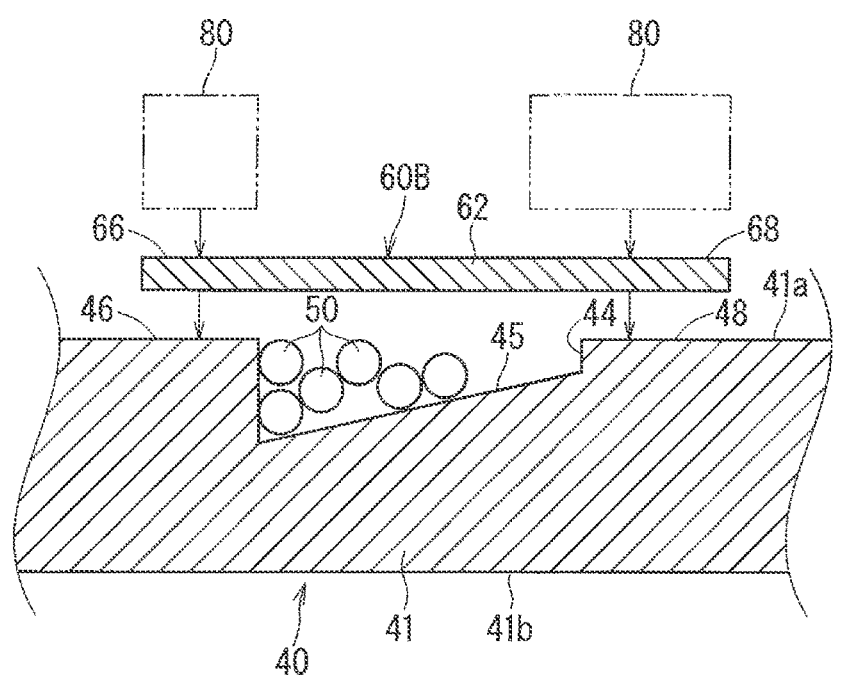

WIRING MODULE

TECHNICAL FIELD

The present disclosure relates to a wiring module.

BACKGROUND ART

Patent Document 1 discloses a wiring member-integrated incorporated component including an incorporated component incorporated into a box-like member and a wiring member held by the incorporated component. In the wiring member-integrated incorporated component described in Patent Document 1, the wiring member is held in a groove formed in the incorporated component.

PRIOR ART DOCUMENTS

Patent Document(s)

Patent Document 1: International Publication No. 2019/187334

SUMMARY

Problem to be Solved by the Invention

When the groove is larger than the wiring member, the wiring member moves inside the groove in accordance with vibration of a vehicle, for example, and when the wiring member collides with a wall of the groove, for example, sound may occur. When the sound gets large, there is a possibility that a passenger of the vehicle hears the sound.

Accordingly, an object is to provide a technique capable of suppressing occurrence of large sound in a wiring module in which a wiring member is held in a groove.

Means to Solve the Problem

A wiring module according to the present disclosure is a wiring module including: a base member provided with at least one groove; at least one wiring member housed in the groove; and a cover member covering an opening part of the groove to suppress the wiring member coming out of the groove, wherein the cover member includes a cover body covering the opening part of the groove, a first extension part extending from the cover body to one lateral side of the groove, and a second extension part extending from the cover body to another lateral side of the groove, the first extension part is fused to a first side edge portion of the base member located on the one lateral side of the groove, the second extension part is fused to a second side edge portion of the base member located on the another lateral side of the groove, the wiring member is located close to a side of the first side edge portion inside the groove, and a protruding part entering inside the groove is provided to the cover body on a side of the second side edge portion.

Effects of the Invention

According to the present disclosure, occurrence of large sound can be suppressed in a wiring module in which a wiring member is held in a groove.

BRIEF DESCRIPTION OF DRAWINGS

FIG. 1 is a plan view illustrating a door wiring module according to an embodiment 1 and a door panel into which the door wiring module is incorporated.

FIG. 2 is a cross-sectional view along a II-II line in FIG. 1.

FIG. 3 is a schematic diagram illustrating a cover member fixed to a base member.

DESCRIPTION OF EMBODIMENT(S)

Description of Embodiment of Present Disclosure

Embodiments of the present disclosure are listed and described firstly.

A wiring module according to the present disclosure is as follows.

(1) A wiring module includes: a base member provided with at least one groove; at least one wiring member housed in the groove; and a cover member covering an opening part of the groove to suppress the wiring member coming out of the groove, wherein the cover member includes a cover body covering the opening part of the groove, a first extension part extending from the cover body to one lateral side of the groove, and a second extension part extending from the cover body to another lateral side of the groove, the first extension part is fused to a first side edge portion of the base member located on the one lateral side of the groove, the second extension part is fused to a second side edge portion of the base member located on the another lateral side of the groove, the wiring member is located close to a side of the first side edge portion inside the groove, and a protruding part entering inside the groove is provided to the cover body on a side of the second side edge portion. The wiring member is located close to the side of the first side edge portion inside the groove, and the protruding part entering inside the groove is provided to the cover body on the side of the second side edge portion, thus an inner space of the groove is narrowed. Accordingly, a space for movement of the wiring member is reduced inside the groove, thus the wiring member and an inner surface of the groove hardly collide with each other. Even when they collide with each other, energy of the wiring member in collision is reduced by reason that the space where the wiring member can move is small. Accordingly, occurrence of large sound can be suppressed in a wiring module in which a wiring member is held in a groove.

(2) In the wiring module according to (1), a bottom surface of the groove may be inclined so that a depth of the groove gets larger from the side of the second side edge portion toward the side of the first side edge portion. Accordingly, the wiring member is easily in the state of being close to the side of the first side edge portion.

(3) In the wiring module according to (1) or (2), the protruding part may be fused to the bottom surface of the groove. Accordingly, the protruding part is easily kept inside the groove.

(4) In the wiring module according to any one of (1) to (3), fusion strength between the second extension part and the second side edge portion may be larger than fusion strength between the first extension part and the first side edge portion. For example, energy applied to a fusion part between the second extension part and the second side edge portion is larger than energy applied to a fusion part between the first extension part and the first side edge portion, thus the fusion strength between the second extension part and the second side edge portion is larger than the fusion strength between the first extension part and the first side edge portion. At this time, the energy applied to the fusion part between the second extension part and the second side edge portion is large, thus the cover member is thermally deformed in fusing the second extension part and the second side edge portion, and the protruding part can be provided.

(5) In the wiring module according to (4), a concave part corresponding to a convex shape in an inner surface may be formed in an outer surface of the protruding part. Accordingly, a member having a simple shape such as a flat plate can be used as the cover member before fusion.

(6) In the wiring module according to any one of (1) to (5), the plurality of wiring members may be housed in the one groove. When the plurality of wiring members are housed in one groove, a gap between the groove and the wiring member easily gets large compared with a case where one wiring member is housed in one groove. Even in this case, occurrence of large sound can be suppressed in the wiring module in which the wiring member is held in the groove.

(7) In the wiring module according to any one of (1) to (6), the base member may be disposed in a vehicle so that the first side edge portion and the second side edge portion are arranged along a vertical direction. Accordingly, occurrence of large sound caused by vertical vibration can be suppressed even when the wiring module is disposed in a position where the vertical vibration easily occurs in the vehicle.

Detailed Description of Embodiment of Present Disclosure

Specific examples of a wiring module of the present disclosure are described hereinafter with reference to the drawings. The present disclosure is not limited to these examples, but is indicated by claims, and it is intended that meanings equivalent to claims and all modifications within a scope of claims are included.

Embodiment 1

A wiring module according to an embodiment 1 is described hereinafter. FIG. 1 is a plan view illustrating a wiring module 30 according to the embodiment 1 and a door panel 20 into which the wiring module 30 is incorporated. FIG. 2 is a cross-sectional view along a II-II line in FIG. 1. FIG. 3 is a schematic diagram illustrating a cover member 60 fixed to a base member 40.

In the description herein, the wiring module according to the present example is incorporated into a door 10 in a vehicle. Firstly, an outline of the door 10 in the vehicle is described. The door 10 is formed into a flat shape as a whole, and is a part openable and closable to partition an inner side and outer side of a vehicle. The door 10 is assumed to be a driver side door, a passenger's side door, and a rear seat door, for example. The door 10 includes the door panel 20, a design trim, and the wiring module 30.

The door panel 20 includes an outer panel 21 and an inner panel 22. The outer panel 21 is provided to a part of the door 10 facing an outer side of the vehicle to constitute an appearance of the vehicle together with a body part. The inner panel 22 is provided to a vehicle interior side of the outer panel 21. The inner panel 22 includes a side plate part 23 and a main plate part 25. The side plate part 23 is a part protruding from the outer panel 21 to the inner side of the vehicle. The main plate part 25 is a part continuing into the side plate part 23, and extends along the outer panel 21 with a distance from the outer panel 21. A space is formed between the outer panel 21, the main plate part 25, and the side plate part 23. A door apparatus provided to the door 10 is disposed and a window glass is housed in the space. A service hole 26 is provided to the main plate part 25 of the inner panel 22. An operator can have access to the space between the outer panel 21 and the inner panel 22 via the service hole 26 from an outer side of the inner panel 22.

The design trim is a part provided in a part of the door 10 facing the inner side of the vehicle to constitute the interior of the vehicle. An inner handle and an operation part of an in-vehicle apparatus, for example, are attached to the design trim. A part of the wiring module 30 incorporated into the door 10 is disposed between the design trim and the outer panel 21.

The wiring module 30 includes the base member 40, a wiring member 50, and the cover member 60.

The base member 40 covers the service hole 26. The base member 40 is a flat resin component extending to a range approximately equal to or wider than the service hole 26. The base member 40 is attached to cover the service hole 26. The base member 40 according to the present example is also referred to as a service hole cover or an inner trim. An attachment state where the base member 40 is attached to the service hole 26 of the inner panel 22 is held by screwing, a locking structure, or adhesion, for example. For example, when a surrounding part of the base member 40 overlapped with the inner panel 22 is bonded to the inner panel 22, a gap therebetween can be practicably covered.

The base member 40 partitions the inner side of the vehicle of the space between the outer panel 21 and the inner panel 22. The window glass exposed to a rainwater environment is housed in the space, and a slit-like opening through which the window glass goes in and out is formed on an upper side of the space. Thus, the space is a space which water may enter. The space is a space which may be connected to an outer space, thus is also a space which a wind noise, for example, may enter from outside. The base member 40 is preferably provided as a member for more completely partitioning a vehicle interior space and an outer space with the inner panel 22. More specifically, the base member 40 includes a base body 41, a frame part 42, and a flange part 43. For example, the base member 40 is a component made up of molded resin such as polypropylene (PP), and has rigidity of hardly bended.

The base body 41 is a portion planarly extend to a range slightly smaller than the service hole 26. The frame part 42 is formed to protrude to a side of one main surface 41a (inner side of the vehicle) of the base body 41 from an outer edge of the base body 41. The flange part 43 is formed to protrude to a side of an outer periphery from an outer edge of the frame part 42. It is sufficient that the frame part 42 is formed to have an inclined surface with a gradually decreasing height dimension from the flange part 43 toward the base body 41. The base body 41 is disposed on an inner side of the service hole 26 (closer to a side of the outer panel 21 than the main plate part 25) while the base member 40 is attached to a predetermined position of the service hole 26 of the inner panel 22, the flange part 43 is disposed on an outer side of the service hole 26 (closer to the inner side of the vehicle than the main plate part 25), and the frame part 42 connects the base body 41 and the flange part 43. Accordingly, the frame part 42 and the flange part 43 cover a portion between an opening edge portion of the base body 41 and a peripheral edge portion of the service hole 26.

A groove 44 is formed in a main surface of the base member 40 (the main surface 41a of the base body 41). Herein, the groove 44 is formed in the main surface 41a of the base member 40 directed to the inner side of the vehicle. The groove 44 may be formed in the main surface 41b of the base member 40 directed to the outer side of the vehicle. The groove 44 may be formed in both the main surfaces 41*a* and 41*b*.

The plurality of wiring members 50 are housed in one groove 44. The groove 44 is formed to have a size capable of collectively housing the plurality of wiring members 50. The groove 44 is flatly formed so that a width dimension thereof is larger than a depth dimension thereof. It is sufficient that the depth dimension of the groove 44 is larger than a diameter of the wiring member 50 (in a case where the plurality of wiring members 50 include a wiring member with a different thickness, a diameter of the maximum wiring member 50). It is sufficient that the depth dimension of the groove 44 is more than twice as large as the diameter of the wiring member 50 (in a case where the plurality of wiring members 50 include a wiring member with a different thickness, a diameter of the minimum wiring member 50) so that the wiring members 50 can be stacked in two or more layers and housed therein. A plurality of grooves each having a size capable of separately housing the plurality of wiring members 50 may be formed in parallel to each other as the groove 44. For example, a plurality of grooves each having a size to house one wiring member 50 may be formed in parallel to each other.

An opening part of the groove 44 is covered by the cover member 60. The cover member 60 is fixed to both sides of the groove 44 in the base member 40. One lateral side of the groove 44 in the base member 40 is a first side edge portion 46, and the other lateral side thereof is a second side edge portion 48. A bottom surface 45 of the groove 44 is inclined so that the depth of the groove 44 gets larger from a side of the second side edge portion 48 toward a side of the first side edge portion 46. A cross-sectional surface of the groove 44 has a trapezoidal shape. The cross-sectional surface of the groove 44 may have a shape other than a trapezoidal shape. For example, the cross-sectional surface of the groove may have a triangular shape so that the bottom surface 45 of the groove and the second side edge portion 48 are directly connected to each other.

An insertion hole 49 passing the wiring member 50 is formed in the base member 40. The wiring member 50 passes through the base member 40 through the insertion hole 49. It is sufficient that the insertion hole 49 is formed in the base body 41 or the frame part 42 in the base member 40. Herein, the insertion hole 49 is formed in the frame part 42. Particularly, the insertion hole 49 is formed in a position of an end portion of the groove 44 in the frame part 42 herein. Accordingly, the wiring member 50 housed in the groove 44 can pass through the base member 40 through the insertion hole 49.

The wiring member 50 connects the door apparatus and a vehicle body apparatus provided to a vehicle body to supply electrical power to the door apparatus or transmit a signal between the door apparatus and the vehicle body apparatus. The wiring member 50 may include an electrical wire 52. A covering wire having a core wire made up of a conductor with a covering layer around the core wire can be used as the electrical wire 52. The core wire may be a single core wire or a stranded wire. A type of the electrical wire 52 is not particularly limited, but can include a single wire or a composite wire. The single wire is an electrical wire having one conductive route. The composite wire is an electrical wire having a plurality of conductive routes. Applicable as the composite wire is a twisted wire or a composite cable, for example, formed of a plurality of single wires combined with each other. The wiring member 50 may include an optical fiber cable, for example. The number of the wiring members 50 is set in accordance with the number of the door apparatuses. The plurality of wiring members 50 are normally provided.

A route of the plurality of wiring members 50 is appropriately set in accordance with a specification of the door 10. For example, in a case of a general hinge door having a rotational axis extending along a height direction of a vehicle, the plurality of wiring members 50 assembled to the hinge door are normally connected to a vehicle body at a position near a door hinge, and are branched at a time of being directed from a side of the door hinge toward a side opposite to the door hinge to be connected to various types of door apparatus.

More specifically, it is assumed that one end portions of the plurality of wiring members 50 go through a part of the door 10 (the side plate part 23 on the side of the door hinge in the example illustrated in FIG. 1) to extend from the door 10 in a bundled state, and are led inside the vehicle body to be connected to the vehicle body apparatus via a common connector C1, for example, or a relay connector provided to an end portion of a wiring member extending from the vehicle body apparatus. The vehicle body apparatus is not particularly limited, but is assumed to be an electric control unit (ECU) or a battery, for example. A grommet G is normally attached to a part of the plurality of wiring members 50 extending between the door 10 and the vehicle body. In the example illustrated in FIG. 1, the grommet G is a so-called feed-through grommet inserted and locked to a through hole formed in the side plate part 23. Accordingly, ingress of water through the through hole is suppressed. The grommet G may be a so-called non-feed-through grommet fitted into a concave part formed in an edge portion where the side plate part 23 and the main plate part 25 intersect with each other. The plurality of wiring members 50 extend from the grommet G on a way from one end portion to the other portion, and are branched and extend toward the door apparatus as connection destinations, respectively. Connectors C2 and C3 corresponding to the door apparatuses as the connection destinations, respectively, are attached to the other end portions of the plurality of wiring members 50. The connectors C2 and C3 are connected to connectors C4 and C5 on sides of the door apparatuses, respectively, for example. FIG. 1 and FIG. 2 exemplify the connectors C4 and C5 on the sides of two door apparatuses and electrical wires 52A and 52B connected to the connectors C4 and C5 via the connectors C2 and C3, respectively. The connector C4 is a connector for an actuator for locking and unlocking the door 10, for example. The connector C5 is a connector for a foot light, for example.

In FIG. 1 and FIG. 2, illustration of a connector and a wiring member other than the connectors C1 to C3 and the electrical wires 52A and 52B connected to the connectors C1 to C3 is omitted in the wiring module 30. Needless to say, the wiring module 30 may include a connector other than the connectors C1 to C3 or a wiring member other than the electrical wires 52A and 52B.

The electrical wires 52A and 52B pass through the base member 40 through the insertion hole 49 on a way from a portion provided with the grommet G toward the connectors C2 and C3, and extend closer to the inner side of the vehicle than the base member 40. It is also applicable that the electrical wires 52A and 52B pass through a hole in the inner panel 22 other than the service hole 26 on a way from a portion provided with the grommet G toward the connectors C2 and C3 and extend closer to the inner side of the vehicle than the inner panel 22.

A section in the electrical wire 52 extending between the grommet G and the base member 40 may be a banded wire portion bundled by a banding member. In the example illustrated in FIG. 1, the plurality of electrical wires 52 are banded by an adhesive tape T spirally wound. The banding member may be a banding band, a flexible sheet, or a corrugate tube, for example. It is sufficient that the banding member bands the plurality of electrical wires 52 in a state where the plurality of electrical wires 52 can be bended.

A section in the electrical wire 52 extending along the base member 40 is disposed closer to the inner side of the vehicle than the base member 40. A route of the section in the electrical wire 52 extending along the base member 40 is regulated by the base member 40. The state where the route of the electrical wire 52 is regulated indicates that the route of the electrical wire 52 is maintained in a predetermined route.

The section in the electrical wire 52 extending along the base member 40 is housed in the groove 44. The groove 44 is formed along a route of the electrical wire 52 in relation to the base member 40. Herein, three grooves 44A, 44B, and 44C are formed as the groove 44. The groove 44A is formed along a front-back direction of the vehicle from a front portion to a back portion of the base member 40. When the base member 40 is observed from the vehicle interior side, the groove 44A is linearly formed to extend along the front-back direction of the vehicle. The grooves 44B and 44C are branched from an end portion of the groove 44A. The groove 44B is linearly formed to extend along the front-back direction of the vehicle. The groove 44C is linearly formed to extend along a height direction of the vehicle. Each groove 44 needs not linearly extend on the main surface 41*a* of the cover body, but may be bended and extend on the main surface 41*a* of the cover body.

The electrical wires 52A and 52B are branched into two branch wire parts from one main wire part in the branch part on the base member 40. The main wire part is a portion where the electrical wires 52A and 52B are parallelly arranged. Two branch wire parts are portions where the electrical wires 52A and 52B extend independently. The main wire part is housed in the groove 44A, and two branch wire parts are housed in the grooves 44B and 44C, respectively. The grooves 44A and 44B can be used to hold the electrical wire 52A connected to the door apparatus incorporated into a back portion of the door 10 such as an actuator for locking and unlocking the door, for example. The grooves 44A and 44C can be used to hold the electrical wire 52B connected to the door apparatus incorporated into a lower portion of the door 10 such as a foot light, for example. Each groove 44 in a cross-sectional view may be formed to have a size corresponding to the wiring member 50 housed in the groove 44. The groove 44A housing the main wire part in a cross-sectional view may be formed to have a size larger than the grooves 44B and 44C each housing the branch wire part in a cross-sectional view.

The plurality of electrical wires 52 are housed in the groove 44 in a state of being free from each other. The state of being free from each other indicates a state where the plurality of electrical wires 52 are not banded by a banding member. The plurality of electrical wires 52 are located separately one by one in the groove 44. A section in the plurality of electrical wires 52 disposed on the base member 40 is in a banded state by being housed in the groove 44 and covered by the cover member 60. The plurality of electrical wires 52 may be housed in the groove 44 while being banded by the banding member.

The cover member 60 covers the opening part of the groove 44 to suppress the wiring member 50 coming out of the groove 44. The cover member 60 is fixed to the base member 40. The cover member 60 is formed into a plate-like shape to be disposed to extend across the groove 44 on the upper portion of the groove 44, for example. The cover member 60 includes a cover body 62, a first extension part 66, and a second extension part 68. The cover body 62 is a part of the cover member 60 covering the groove 44. The first extension part 66 is a part of the cover member 60 extending to one lateral side of the groove 44 from the cover body 62. The second extension part 68 is a part of the cover member 60 extending to the other lateral side of the groove 44 from the cover body 62. The first extension part 66 is fixed to the first side edge portion 46. The second extension part 68 is fixed to the second side edge portion 48.

The cover member 60 is made up of rigid resin such as rigid polyvinyl chloride (PVC) or PP, for example. The cover member 60 has rigidity large enough not to extend even when the wiring member 50 housed in the groove 44 presses the cover body 62 toward an outer side of the groove 44. Accordingly, increase in a housing space for housing the wiring member 50 is suppressed. The housing space of the wiring member 50 is a space surrounded by the base member 40 and the cover member 60. The housing space of the wiring member 50 includes an inner space of the groove 44.

The wiring member 50 is located close to the first side edge portion 46 in the groove 44. A space where the wiring member 50 is not disposed occurs on a side of the second side edge portion 48 in the groove 44. A part of the cover body 62 enters inside the groove 44 to fill the space on the side of the second side edge portion 48. The part of the cover body 62 entering inside the groove 44 on the side of the second side edge portion 48 is a protruding part 63. The protruding part 63 is provided to the cover body 62. The protruding part 63 reaches the bottom surface 45 of the groove 44.

The base member 40 and the cover member 60 are fused and fixed to each other. The base member 40 and a cover member 60B are preferably made up of the same type of resin. For example, the base member 40 and the cover member 60B can be made up of thermoplastic resin such as PP as a main component. The first extension part 66 and the first side edge portion 46 are fused to each other. The second extension part 68 and the second side edge portion 48 are fused to each other. The protruding part 63 and the bottom surface 45 of the groove 44 are fused to each other. FIG. 2 illustrates a fusion part WP1 between the first extension part 66 and the first side edge portion 46, a fusion part WP2 between the second extension part 68 and the second side edge portion 48, and a fusion part WP3 between the protruding part 63 and the bottom surface 45 of the groove 44.

The protruding part 63 is a thermal deformation part. The cover body 62 is thermally deformed in fusing the second extension part 68 and the second side edge portion 48, and the protruding part 63 is provided. At this time, large energy is applied to the side of the second side edge portion 48 of the cover body 62 so that the side of the second side edge portion 48 is significantly deformed. Accordingly, fusion strength between the second extension part 68 and the second side edge portion 48 is larger than that between the first extension part 66 and the first side edge portion 46.

In the present example, a flat plate-like member is deformed, and the protruding part 63 is provided. Thus, a concave part 64 corresponding to a convex shape in an inner surface is formed in an outer surface of the protruding part 63.

In the present example, the cover member 60 is assumed to be deformed at a time of being fused to the base member 40. In the description hereinafter, when the cover member 60 before being attached and the cover member 60 after being attached need to be distinguished, a code B is added to the cover member 60 to be referred to as the cover member 60B in some cases. FIG. 3 illustrates the cover member 60B before being attached. A flat plate-like member in which both surfaces are flat as illustrated in FIG. 3 is used as the cover member 60B. An attachment surface of the first side edge portion 46 and an attachment surface of the second side edge portion 48 are flat.

After the wiring member 50 is housed in the groove 44, the base member 40 and the cover member 60 are fused to each other by a fusion apparatus 80 as illustrated in FIG. 3. FIG. 3 illustrates an example that the first extension part 66 and the second extension part 68 are fused to the first side edge portion 46 and the second side edge portion 48 after the wiring member 50 is housed in the groove 44. However, it is also applicable that the first extension part 66 is fused to the first side edge portion 46 before the wiring member 50 is housed in the groove 44, and the second extension part 68 is fused to the second side edge portion 48 after the wiring member 50 is housed in the groove 44. In this case, the wiring member 50 may be entered into the groove 44 from between the second extension part 68 and the second side edge portion 48 while the first extension part 66 is fused to the first side edge portion 46 and the second extension part 68 is not fused to the second side edge portion 48.

The fusion apparatus 80 is not particularly limited, however, a heat fusion apparatus or an ultrasonic fusion apparatus, for example, is also applicable. The fusion apparatus 80 may press and fuse the base member 40 and the cover member 60. Energy applied to the fusion parts WP1 and WP2 is determined by a heating temperature (output of a horn), a heating time (activation time of a horn), a heating region, power of a press, for example. The energy applied to the fusion parts WP1 and WP2 gets larger as the heating temperature (output of a horn) gets higher, the heating time (activation time of a horn) gets longer, and the power of the press gets larger. For example, when at least one of these conditions is set to be higher in the fusion part WP2 than that in the fusion part WP1, the energy applied to the fusion part WP2 is larger than that applied to the fusion part WP1.

The flat plate-like cover member 60B is plastically deformed upon receiving the energy in fusion, and is formed to be the cover member 60 having the shape of the protruding part 63 and the concave part 64. At this time, it is also applicable that the flat plate-like cover member 60B is plastically deformed upon receiving the energy in fusion, and reaches the bottom surface 45 of the groove 44, and is furthermore fused thereto. The flat plate-like cover member 60B may be plastically deformed upon receiving the energy in fusion to have contact with the wiring member 50. At this time, the cover member 60B may be or may not be fused to the wiring member 50. It is also applicable that the second side edge portion 48 receives lager energy in fusion than the first side edge portion 46, thus is deformed to be inclined toward the side of the bottom surface 45 of the groove 44.

In the example illustrated in FIG. 1, the cover member 60 is provided in a position of one end portion and the other end portion along a longitudinal direction of each groove 44. However, the position where the cover member 60 is provided in the base member 40 is not particularly limited, but can be appropriately set. For example, the cover member 60 may be provided only in one position for a groove having a short length. For example, the cover member 60 may be provided in positions of one end portion and the other end portion and moreover, in a position therebetween along the longitudinal direction of the groove for the groove having a long length.

The base member 40 is disposed in the vehicle so that the first side edge portion 46 and the second side edge portion 48 are arranged along the vertical direction. In this case, the wiring member 50 gets closer to the first side edge portion 46 or the second side edge portion 48 located on a vertically lower side by self-weight. Accordingly, a gap between the wiring member 50 and the first side edge portion 46 or the second side edge portion 48 located on a vertically upper side gets large. Particularly, the groove 44 has a larger dimension in a width direction than in a depth dimension, thus the gap between the wiring member 50 and the first side edge portion 46 or the second side edge portion 48 located on the vertically upper side gets large. When the wiring module 30 is disposed in a portion such as the door 10 where vertical vibration easily occurs in the vehicle, a direction in which a large gap occurs in the groove 44 and a vibration direction coincide with each other. Thus, when the protruding part 63 is not provided, the wiring member 50 and the inner surface of the groove 44 collide with each other in the vibration, and large sound easily occurs.

In contrast, according to the present disclosure, the protruding part 63 is provided, thus the protruding part 63 can fill the gap occurring in the vibration direction between the wiring member 50 and the inner surface of the groove 44. The wiring member 50 and the inner surface of the groove 44 hardly collide with each other in the vibration, and large sound hardly occurs even when they collide with each other.

In the present example, the first side edge portion 46 is located on a vertically lower side of the second side edge portion 48 in the vehicle. Accordingly, the wiring member 50 can be supported by the inner surface of the groove 44, that is the surface connecting the bottom surface 45 and the first side edge portion 46. Accordingly, the wiring member 50 is easily kept in the state of being close to the side of the first side edge portion 46. The protruding part 63 is located on the upper side of the wiring member 50, thus there is a limited range that the wiring member 50 can move in the vehicle compared with a case there the second side edge portion 48 is located on the vertically upper side of the first side edge portion 46 even when there is a space where the wiring member 50 can move on the upper side of the wiring member 50 located on a vertically uppermost side. Furthermore, in the present example, the bottom surface 45 of the groove 44 is an inclined surface, thus the depth of the groove 44 gets smaller with decreasing distance to the vertically upper side. Also from this point, there is a limited range that the wiring member 50 can move even when there is a space where the wiring member 50 can move on the upper side of the wiring member 50 located on the vertically uppermost side. Accordingly, the wiring member 50 and the inner surface of the groove 44 hardly collide with each other in the vibration, and large sound hardly occurs even when they collide with each other.

Effect Etc.

The wiring member 50 is located close to the side of the first side edge portion 46 inside the groove 44, and the protruding part 63 entering inside the groove 44 is provided to the side of the second side edge portion 48 in the cover body 62, thus the inner space of the groove 44 is narrowed. Accordingly, a space where the wiring member 50 can move is reduced inside the groove 44, thus the wiring member 50 and the inner surface of the groove 44 hardly collide with each other. Even when they collide with each other, energy of the wiring member 50 in collision is reduced by reason that the space where the wiring member 50 can move is small. Accordingly, occurrence of large sound can be suppressed in the wiring module 30 in which the wiring member 50 is held in the groove 44.

The bottom surface 45 of the groove 44 is inclined so that the depth of the groove 44 gets larger from the side of the second side edge portion 48 toward the side of the first side edge portion 46. Accordingly, the wiring member 50 is easily kept in the state of being close to the side of the first side edge portion 46.

The protruding part 63 is fused to the bottom surface 45 of the groove 44. Accordingly, the protruding part 63 is easily kept inside the groove 44.

Fusion strength between the second extension part 68 and the second side edge portion 48 is larger than that between the first extension part 66 and the first side edge portion 46. For example, energy applied to the fusion part WP2 between the second extension part 68 and the second side edge portion 48 is larger than energy applied to the fusion part WP1 between the first extension part 66 and the first side edge portion 46, thus the fusion strength between the second extension part 68 and the second side edge portion 48 is larger than the fusion strength between the first extension part 66 and the first side edge portion 46. At this time, the energy applied to the fusion part WP2 between the second extension part 68 and the second side edge portion 48 is large, thus the cover member 60B is thermally deformed in fusing the second extension part 68 and the second side edge portion 48, and the protruding part 63 can be provided.

The concave part 64 corresponding to the convex shape in the inner surface is formed in the outer surface of the protruding part 63. Accordingly, a member having a simple shape such as a flat plate can be used as the cover member 60B before fusion.

The plurality of wiring members 50 are housed in one groove 44. In this case, in a case where a size of a housing space per wiring member 50 in the groove 44 is constant, for example, a continuous gap occurring between the groove 44 and the wiring member 50 tends to be large compared with a case where one wiring member is housed in one groove when the plurality of wiring members 50 are moved and collected. Even in this case, occurrence of large sound can be suppressed by the protruding part 63 entering inside the groove 44 in the wiring module 30 in which the wiring member 50 is held in the groove 44.

The base member 40 is disposed in the vehicle so that the first side edge portion 46 and the second side edge portion 48 are arranged along the vertical direction. Accordingly, occurrence of large sound caused by vertical vibration can be suppressed even when the wiring module 30 is disposed in a position where the vertical vibration easily occurs in the vehicle.

APPENDIX

In the above description, the wiring module 30 is incorporated into the door 10, however, this configuration is not necessary. The wiring module 30 may be incorporated into a portion other than the door 10 in the vehicle. In this case, a member corresponding to a position where the member is incorporated is preferably used as the base member 40. For example, the wiring module may be incorporated into an installment panel. In this case, the base member may be the installment panel.

In the above description, the bottom surface 45 of the groove 44 is inclined so that the depth of the groove 44 gets larger from the side of the second side edge portion 48 toward the side of the first side edge portion 46, however, this configuration is not necessary. For example, the bottom surface of the groove may be flat so that the depth of the groove is uniform from the side of the second side edge portion 48 toward the side of the first side edge portion 46.

In the above description, the protruding part 63 is fused to the bottom surface 45 of the groove 44, however, this configuration is not necessary. The protruding part 63 may not be fused to the bottom surface 45 of the groove 44. In this case, the protruding part 63 may or may not reach the bottom surface 45 of the groove 44.

In the above description, fusion strength between the second extension part 68 and the second side edge portion 48 is larger than that between the first extension part 66 and the first side edge portion 46, however, this configuration is not necessary. The fusion strength between the second extension part 68 and the second side edge portion 48 may be equal to or smaller than that between the first extension part 66 and the first side edge portion 46. The protruding part 63 may not be provided in fusing the second extension part 68 and the second side edge portion 48. The protruding part 63 may be previously formed in the cover member 60B before fixation.

In the above description, the concave part 64 corresponding to the convex shape in the inner surface is formed in the outer surface of the protruding part 63, however, this configuration is not necessary. For example, the outer surface of the cover member including the outer surface of the protruding part 63 may be flat. In this case, the cover member may be partially formed to be thick in the position of the protruding part 63 compared with the positions of the first extension part 66 and the second extension part 68.

In the above description, the plurality of wiring members 50 are housed in one groove 44, however, this configuration is not necessary. One wiring member 50 may be housed in one groove 44. In this case, the plurality of grooves corresponding to the number of the wiring members 50 may be provided in parallel to each other.

In the above description, the base member 40 is disposed in the vehicle so that the first side edge portion 46 and the second side edge portion 48 are arranged along the vertical direction, however, this configuration is not necessary. The base member 40 may be disposed in the vehicle so that the first side edge portion 46 and the second side edge portion 48 are arranged along a horizontal direction.

The configurations described in the embodiments and modification examples thereof can be appropriately combined as long as they are not contradictory.

EXPLANATION OF REFERENCE SIGNS

10 door
20 door panel
21 outer panel
22 inner panel
23 side plate part
25 main plate part
26 service hole
30 wiring module
40 base member
41 base body
41a, 41b main surface
42 frame part
43 flange part
44, 44A, 44B, 44C groove

45 bottom surface
46 first side edge portion
48 second side edge portion
49 insertion hole
50 wiring member
52, 52A, 52B electrical wire
60, 60B cover member
62 cover body
63 protruding part
64 concave part
66 first extension part
68 second extension part
C1, C2, C3, C4, C5 connector
G grommet
T adhesive tape
WP1, WP2, WP3 fusion part
The invention claimed is:

1. A wiring module, comprising:
a base member provided with at least one groove;
at least one wiring member housed in the groove; and
a cover member covering an opening part of the groove to suppress the wiring member coming out of the groove, wherein
the cover member includes a cover body covering the opening part of the groove, a first extension part extending from the cover body to one lateral side of the groove, and a second extension part extending from the cover body to another lateral side of the groove,
the first extension part is fused to a first side edge portion of the base member located on the one lateral side of the groove,
the second extension part is fused to a second side edge portion of the base member located on the another lateral side of the groove,
the wiring member is located close to a side of the first side edge portion inside the groove,
a protruding part entering inside the groove is provided to the cover body on a side of the second side edge portion, and
a bottom surface of the groove is inclined so that a depth of the groove gets larger from the side of the second side edge portion toward the side of the first side edge portion.

2. The wiring module according to claim 1, wherein
fusion strength between the second extension part and the second side edge portion is larger than fusion strength between the first extension part and the first side edge portion.

3. The wiring module according to claim 2, wherein
a concave part corresponding to a convex shape in an inner surface is formed in an outer surface of the protruding part.

4. The wiring module according to claim 1, wherein
the plurality of wiring members are housed in the one groove.

5. The wiring module according to claim 1, wherein
the base member is disposed in a vehicle so that the first side edge portion and the second side edge portion are arranged along a vertical direction.

6. A wiring module, comprising:
a base member provided with at least one groove;
at least one wiring member housed in the groove; and
a cover member covering an opening part of the groove to suppress the wiring member coming out of the groove, wherein
the cover member includes a cover body covering the opening part of the groove, a first extension part extending from the cover body to one lateral side of the groove, and a second extension part extending from the cover body to another lateral side of the groove,
the first extension part is fused to a first side edge portion of the base member located on the one lateral side of the groove,
the second extension part is fused to a second side edge portion of the base member located on the another lateral side of the groove,
the wiring member is located close to a side of the first side edge portion inside the groove,
a protruding part entering inside the groove is provided to the cover body on a side of the second side edge portion, and
the protruding part is fused to the bottom surface of the groove.

7. A wiring module, comprising:
a base member provided with at least one groove;
at least one wiring member housed in the groove; and
a cover member covering an opening part of the groove to suppress the wiring member coming out of the groove, wherein
the cover member includes a cover body covering the opening part of the groove, a first extension part extending from the cover body to one lateral side of the groove, and a second extension part extending from the cover body to another lateral side of the groove,
the first extension part is fused to a first side edge portion of the base member located on the one lateral side of the groove,
the second extension part is fused to a second side edge portion of the base member located on the another lateral side of the groove,
the wiring member is located close to a side of the first side edge portion inside the groove,
a protruding part entering inside the groove is provided to the cover body on a side of the second side edge portion, and
in a direction from the first side edge portion toward the second side edge portion, the protruding part is located adjacent to the wiring member.

* * * * *